US012182333B2

United States Patent
Morin et al.

(10) Patent No.: US 12,182,333 B2
(45) Date of Patent: Dec. 31, 2024

(54) DISPLAY USER INTERFACE METHOD AND SYSTEM

(71) Applicant: INTERDIGITAL MADISON PATENT HOLDINGS, SAS, Paris (FR)

(72) Inventors: Thomas Morin, Saint-Gregoire (FR); Erik Reinhard, Hédé-Bazouges (FR); Gwenaelle Marquant, la chapelle chaussee (FR); Serge Defrance, Rennes (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 24 days.

(21) Appl. No.: 17/911,274

(22) PCT Filed: Mar. 11, 2021

(86) PCT No.: PCT/EP2021/056251
§ 371 (c)(1),
(2) Date: Sep. 13, 2022

(87) PCT Pub. No.: WO2021/180883
PCT Pub. Date: Sep. 16, 2021

(65) Prior Publication Data
US 2023/0099167 A1  Mar. 30, 2023

(30) Foreign Application Priority Data
Mar. 13, 2020 (EP) .................................... 20305261

(51) Int. Cl.
*G06F 17/00* (2019.01)
*G06F 3/01* (2006.01)
(Continued)

(52) U.S. Cl.
CPC .......... *G06F 3/017* (2013.01); *G06F 3/04842* (2013.01); *G06F 3/0488* (2013.01); *G06F 2203/04808* (2013.01)

(58) Field of Classification Search
CPC .... G06F 3/017; G06F 3/04842; G06F 3/0488; G06F 2203/04808; G06F 3/04883
See application file for complete search history.

(56) References Cited

U.S. PATENT DOCUMENTS 7,653,883 B2   1/2010  Hotelling et al.
8,773,355 B2   7/2014  Perez et al.
(Continued)

FOREIGN PATENT DOCUMENTS

CN          107688390 A  *  2/2018
WO    WO-2009035705 A1  *  3/2009  ............. G01B 11/14
(Continued)

OTHER PUBLICATIONS

Colgan, Alex, "6 Principles of Leap Motion Interaction Design", Leap Motion, May 17, 2015, 11 pages, URL: http://blog.leapmotion.com/6-principles-of-interaction-design/.

*Primary Examiner* — Laurie A Ries
(74) *Attorney, Agent, or Firm* — VOLPE KOENIG (57) ABSTRACT

A system for user interaction comprising a display including a screen for displaying images, at least one hardware processor for receiving input from at least one sensor detecting at least a position of a user's fingertip in front of the display, the fingertip belonging to a finger extended in a direction of the screen, wherein the at least one hardware processor is configured to determine, from the input from the at least one sensor, an aim of the finger, display on the screen, on condition that the fingertip is in a first zone, at a position corresponding to the aim, an indicator, and select an object displayed in an image on the screen, the object located at the position on the screen corresponding to the aim, on condi- (Continued)

tion that the fingertip is in a second zone, the second zone being closer to the screen than the first zone.

11 Claims, 6 Drawing Sheets

(51) Int. Cl.
*G06F 3/04842* (2022.01)
*G06F 3/0488* (2022.01)

(56) References Cited

U.S. PATENT DOCUMENTS

| | | | | |
|---|---|---|---|---|
| 9,001,053 | B2* | 4/2015 | Nutaro | G06F 3/04847 |
| | | | | 345/173 |
| 9,063,563 | B1* | 6/2015 | Gray | G06F 3/0482 |
| 9,223,499 | B2 | 12/2015 | Johansson | |
| 9,377,866 | B1* | 6/2016 | Schiewe | G06F 3/011 |
| 9,400,575 | B1* | 7/2016 | Karakotsios | G06F 3/0418 |
| 9,898,183 | B1* | 2/2018 | Zhou | G06F 3/0485 |
| 10,281,987 | B1* | 5/2019 | Yang | G06F 3/0426 |
| 10,817,067 | B2* | 10/2020 | Katz | G06F 3/017 |
| 2013/0135192 | A1* | 5/2013 | Shibata | G06F 3/011 |
| | | | | 345/156 |
| 2014/0019897 | A1* | 1/2014 | Satake | G06F 3/0486 |
| | | | | 715/769 |
| 2014/0307919 | A1* | 10/2014 | Yamashita | G06V 40/28 |
| | | | | 382/103 |
| 2015/0346947 | A1 | 12/2015 | Samuelsson | |
| 2016/0132122 | A1 | 5/2016 | Steinle et al. | |
| 2016/0224235 | A1 | 8/2016 | Forsström et al. | |
| 2016/0253038 | A1* | 9/2016 | Kao | G06F 3/04883 |
| | | | | 345/173 |
| 2016/0364007 | A1 | 12/2016 | Kamovich et al. | |
| 2016/0372088 | A1* | 12/2016 | Dow | G06F 1/1626 |
| 2017/0075453 | A1* | 3/2017 | Nakaizumi | G06F 3/04883 |
| 2017/0147188 | A1* | 5/2017 | Rong | G06F 3/04845 |
| 2018/0239509 | A1* | 8/2018 | Hinckley | G06F 3/0482 |
| 2019/0369741 | A1* | 12/2019 | Chen | G06T 7/60 |
| 2022/0382379 | A1* | 12/2022 | Katz | G06F 3/011 |

FOREIGN PATENT DOCUMENTS

| | | | | |
|---|---|---|---|---|
| WO | WO-2012121433 | A1 * | 9/2012 | G06F 3/017 |
| WO | WO-2013051047 | A1 * | 4/2013 | B63B 49/00 |
| WO | WO-2013192454 | A2 * | 12/2013 | G06F 3/0418 |
| WO | WO-2014034031 | A1 * | 3/2014 | G06F 3/017 |
| WO | WO-2024064229 | A1 * | 3/2024 | G06F 3/013 |

* cited by examiner

DISPLAY USER INTERFACE METHOD AND SYSTEM

CROSS REFERENCE TO RELATED APPLICATIONS

This application is a U.S. National Stage Application under 35 U.S.C. 371 of International Patent Application No. PCT/EP2021/056251, filed Mar. 11, 2021, which is incorporated herein by reference in its entirety.

This application claims the benefit of European Application No. 20305261.8, filed Mar. 13, 2020.

TECHNICAL FIELD

The present disclosure relates generally to displays and in particular to a user interface (UI) for displays.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Touch-screen technology has ubiquitous over the last decade or so, but there are areas where it still has not been widely adopted. One such area is for televisions (TVs). TVs not only serve as displays for television programs, but also for video games and so on.

One reason why users are loath to touch their TV is that—unless protective gloves, a screen pen or the like are used—touching the screen leaves marks that typically lower the viewer experience.

US 2016/0132122 A1 provides a UI solution for use in medical environments, such as operating theatres, in which a sensor detects when a user's fingers comes too close to the screen and then provides a warning.

However, this solution can be difficult to use if the "warning distance" is great, and can be of little use if it is small.

It will thus be appreciated that there is a desire for a solution that addresses at least some of the shortcomings of the display user interfaces. The present principles provide such a solution.

SUMMARY OF DISCLOSURE

In a first aspect, the present principles are directed to a system for user interaction, the system comprising a display including a screen for displaying images, at least one hardware processor for receiving input from at least one sensor detecting at least a position of a user's fingertip in front of the display, the fingertip belonging to a finger extended in a direction of the screen, the at least one hardware processor being configured to determine, from the input from the at least one sensor, an aim of the finger, display on the screen, on condition that the fingertip is in a first zone, at a position corresponding to the aim, an indicator, and select an object displayed in an image on the screen, the object located at the position on the screen corresponding to the aim, on condition that the fingertip is in a second zone, the second zone being closer to the screen than the first zone and distant from the screen.

In a second aspect, the present principles are directed to a method of user interaction, comprising receiving input from at least one sensor detecting at least a position of a user's fingertip in front of the display, the fingertip belonging to a finger extended in a direction of a screen, determining, from the input from the at least one sensor, an aim of the finger, displaying on the screen, on condition that the fingertip is in a first zone, at a position corresponding to the aim, an indicator, and selecting an object displayed in an image on the screen, the object located at the position on the screen corresponding to the aim, on condition that the fingertip is in a second zone, the second zone being closer to the screen than the first zone and distant from the screen.

In a third aspect, the present principles are directed to a computer program product which is stored on a non-transitory computer readable medium and includes program code instructions executable by a processor for implementing the steps of a method according to any embodiment of the second aspect.

BRIEF DESCRIPTION OF DRAWINGS

Features of the present principles will now be described, by way of non-limiting example, with reference to the accompanying drawings, in which.

DESCRIPTION OF EMBODIMENTS

Figure 1:
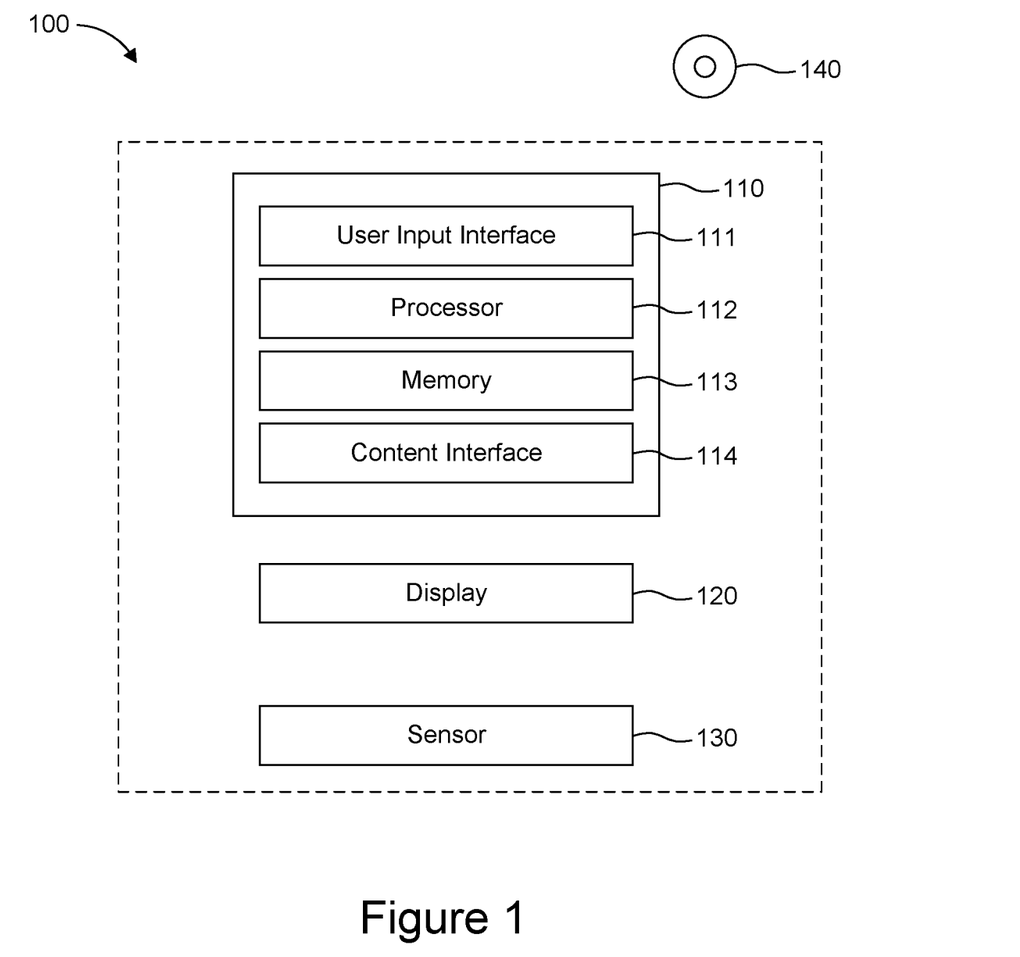
FIG. 1 illustrates a display user interface system according to an embodiment of the present principles.

FIG. 1 illustrates a display user interface (UI) system 100 according to an embodiment of the present principles. The UI system 100 includes a processing device 110, a display 120 and at least one sensor 130.

The processing device 110, the display 120 and the at least one sensor 130 can be separate, connected, devices. For example, the processing device 110 can be a decoder or a set-top box receiving input from one or more standalone sensors 130 and providing output to the display 120, for example a television set.

In embodiments, various combinations are also contemplated, such as for example a separate processing device 110 and combined display 120 and at least one sensor 130, or a combined processing device 110 and display 120 (for example in a television set) connected to at least one separate sensor 130. In a particular embodiment, the processing device 110, the display 120 and the at least one sensor 130 are incorporated in a single device, such as a television set. It should be understood that when the at least one sensor 130 is co-located with at least one other part, the system may still include additional separate sensors.

The processing device 110 typically includes at least one user interface 111, at least one hardware processor ("processor") 112, memory 113, and a communication interface 114.

The user interface 111 is configured to receive signals from a user interface unit, such as a conventional remote control.

The processor 112 configured to execute program code instructions to perform a method according to the present principles.

The memory 113, which can be at least partly non-transitory, is configured to store the program code instructions to be executed by the processor 112, parameters, image data, intermediate results and so on.

The communication interface 114 is configured for communication with external devices, for example to receive content and other information for display on the display 120. The communication interface can implement any suitable technology, wired or wireless or a combination of the two.

The display 120 is configured to display on its screen images provided by the processing device, as is known in the art.

The at least one sensor 130 is configured to detect user gestures in front of the display 120. As mentioned, the at least one sensor can be separate from the display 120, but it can also be integrated in one or more parts of it, such as for example its stand, its frame or even inside its screen.

The at least one sensor 130, which for example can be based on Leap Motion technology, is preferably configured to detect user gestures in front of the entire screen of the display. It is preferred that the at least one sensor 130 is configured to detect distances from the screen in front of the whole screen, i.e. all over the screen; distances are preferably detected with at least essentially the same precision in front of all parts of the screen. It is noted that a plurality of sensors can be needed, in particular if the sensor range is not sufficient to cover detection in from of the entire screen.

It is noted that in case the at least one sensor 130 is separate from the display 120, then calibration may be needed once installed. This is because the estimated position relative to the display 120 typically is correct only when the sensor is, depending on implementation, parallel or perpendicular to the display 120.

If the sensor is not well calibrated, then $X',Y'=f(X, Y, Z)$, where X, Y and Z are the measured position coordinates of the fingertip and X' and Y' are the estimated coordinates of a corresponding position on the screen, and where at least one of $X' \neq X$ and $Y' \neq Y$.

To calibrate the sensor, the user may for example hold a finger at different (X,Y,Z) positions in front of the screen and use the arrows of a remote control to make a corresponding marker on the display correspond to the real fingertip position. The processor 112 can then use this information as input to elemental mathematics to compensate for the discrepancies.

It is further noted that a user may use such calibration to personalize the system to suit the user's individual taste or perception.

A non-transitory storage medium 140 stores computer-readable instructions that, when executed by at least one processor, perform a method of the present principles, such as the method described with reference to FIG. 2.

In the following description, the present principles will be described using gestures similar to the ones used with touch screens, such as click, drag, scroll, etc. It will however be understood that further gestures can be used, in addition to and/or instead of the former gestures, to permit for example enable, disable, contextual menus and so on.

Figure 2:
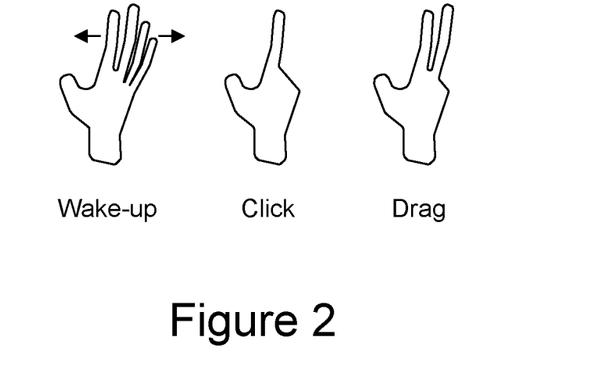
FIG. 2 illustrates examples of user gestures according to embodiments of the present principles.

FIG. 2 illustrates examples of user gestures according to embodiments of the present principles. Three exemplary gestures are illustrated. Spreading of all the fingers of the hand, seen to the left, can be used to signal activation of the system, such as going from a power save mode to an active mode in which the screen is powered. One extended finger, for example the index as in the middle example, can be interpreted as the equivalent of a mouse click. Two extended fingers, for example the index and the major as to the right, can be interpreted as drag. As can be seen, the last two examples are analogous to how some touch screen interfaces work. In case more than one finger is used, one of them can be the 'leading' finger, i.e. the finger that is used to determine what the user aims at.

Figure 3:
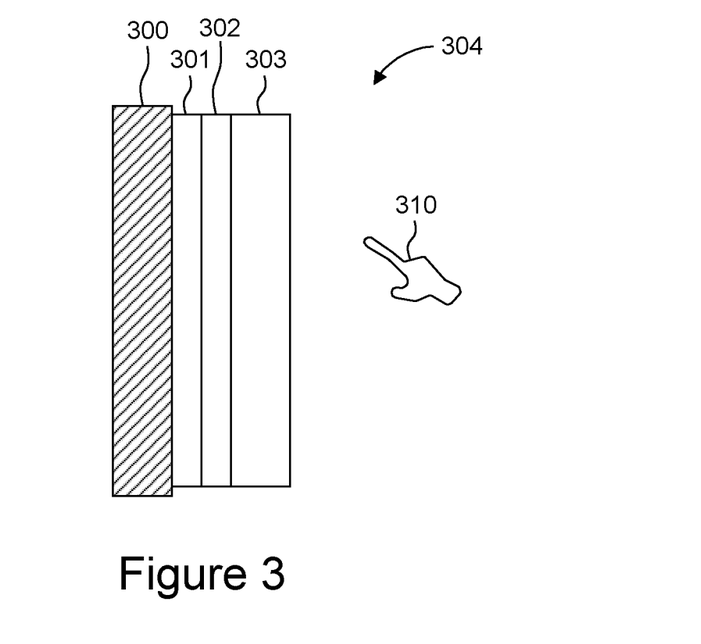
FIG. 3 illustrates a display with conceptual zones according to an embodiment of the present principles.

FIG. 3 illustrates a display with conceptual zones according to an embodiment of the present principles.

Based on input from at least one sensor, the processor estimates the position of the user's hand 310, in particular its extended finger (or fingers in case more than one is used) in three dimensions: horizontal, vertical with reference to the screen of the display 300 and distance from the screen.

The processor further estimates the aim of the user based on the position of the extended finger (or fingers). In one embodiment, the processor estimates the position of the fingertip, which is used as an estimate of the aim; in another embodiment, the processor estimates what the finger is pointing at, which is used as an estimate of the aim. Depending on the distance from the screen, the hand 310 can then be detected in one of up to four, preferably contiguous, zones in front of the display 300.

A protection zone 301, closest to the display 300, is intended to protect the screen from touch. When the processor detects the user's hand 310 in this zone 301, it can give an alarm, for example by changing a displayed image, by rendering a sound on a speaker of the display 300, or both, or otherwise raising an alarm noticeable by the user.

A selection zone 302, next to the protection zone 301 and further away from the screen, is intended as an activation zone. When the processor detects the user's hand in this zone, it is determined as an activation of a command, for example a selection, much as a mouse click activates a selection made by the placement of the cursor using a mouse.

An aiming zone 303, next to the selection zone 302 and further from the screen, is intended for user guidance. When the processor detects the user's hand in this zone, it can provide navigation aid to the user, for example by displaying an indication of what the present hand position is interpreted to "point at".

The device 110 can provide the navigation aid upon detection of a presence in the aiming zone 303, and can also hide the navigation aid after a given time without presence in any of the three zones 301-303.

The navigation aid can be any suitable geometric shape such as a cursor, a circle, a circle surrounded by a ring.

The nature of the navigation aid can depend on the number of fingers in the user gesture. The nature of the navigation aid can also depend on what can be done to an object over which the navigation aid is located, for example if the object can be selected (clickable), if it can be displaced (draggable), and so on. A distant zone 304, finally, next to the aiming zone 303 and further yet from the screen is intended as a neutral zone. In this zone, it is possible that the processor does not even detect the user's hand. Alternatively, the processor can detect the user's hand but not take any specific action. In a further alternative, the device 110 is configured to use, in conjunction with the user interface used in the first three zones 301-303, a different kind of user interface to interpret user gestures in the distant zone, e.g. a user interface using distant gesture control (such as the Xbox Kinect UI). This may require the use of at least one sensor other than the sensor(s) 130, as the latter may not be suited to capture gestures from a longer distance.

Typically, the device 110 only considers the closest presence of a user's arm. In other words, a user's finger in for example the selection zone 302 normally means that parts of the user's hand and/or arm are present zones that are further away, i.e. the aiming zone 303 and the distant zone 304. Presence in these further zones can thus be ignored by the device 110. It should however be noted that the device 110 can detect fingers on more than one hand, belonging to the same or to different users, which can enable multiple simultaneous interactions with the screen.

The feedback provided in response to detected presence in at least the selection zone 302 and the aiming zone 303 typically corresponds to the position of the fingertip in front of the display, i.e. directly in front of the fingertip or, put another way, at the closest distance from the fingertip to the display. It is however noted that this can be changed owing to user or system preferences by the introduction of a (typically small) displacement in the plane of the display. An expression such as "position of the fingertip in front of the display" is intended to cover both of these possibilities.

Figure 4:
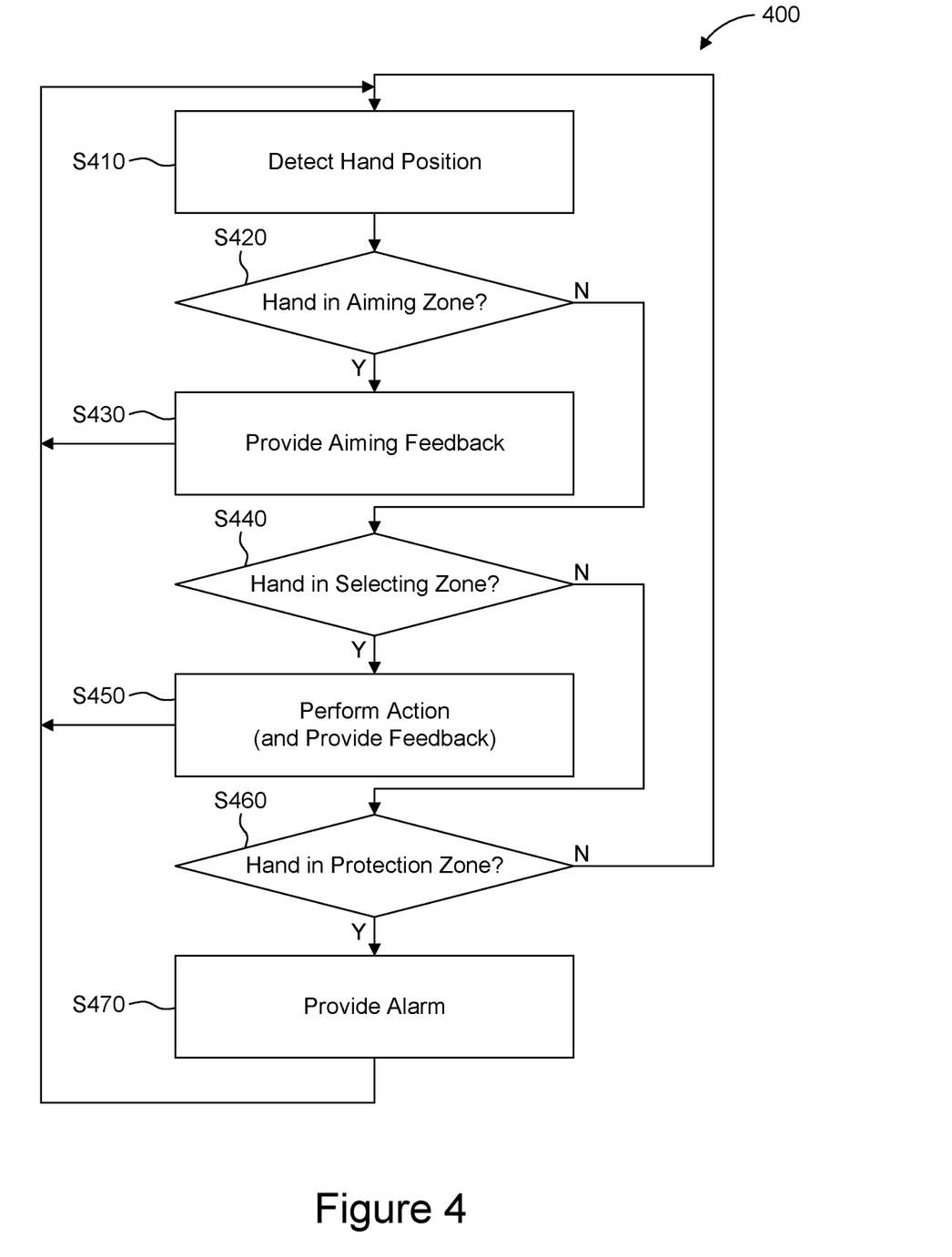
FIG. 4 illustrates a method of user-user interface according to an embodiment of the present principles.

FIG. 4 illustrates a method 400 of user-user interface interaction according to an embodiment of the present principles, FIGS. 5A-5E illustrate display-hand interaction according to embodiments of the present principles, and FIGS. 6A-6F illustrate screen shots with feedback to a user according to embodiments of the present principles.

The method 400 can be performed by the processor (112 in FIG. 1). As a non-limiting example, the user gesture is an extended index. For purposes of illustration, it is assumed that the hand is in front of the screen.

In step S410, the processor uses data from at least one sensor (130 in FIG. 1) to determine the position of a user's hand, in particular of the end of the index. The position can include horizontal and vertical positions with reference to the screen and a distance from the screen.

In step S420, the processor determines, using the distance from the screen, if the hand is in the aiming zone (303 in FIG. 3).

Upon determination that the hand is in the aiming zone, in step S430, the processor provides aiming feedback on the screen. The aiming feedback is intended to inform the user of what the hand aims at, i.e. points to. The aiming feedback can for example be provided as a point surrounded by a circle, as illustrated in FIG. 5B. The aiming feedback can depend on the distance from the screen (or from the border between the selection and aiming zones, for example by narrowing the surrounding circle as the hand approaches the screen (or the border), as illustrated in FIG. 5C. The method then goes back to step S410, in which the processor determines the position of the hand.

Figure 6A:
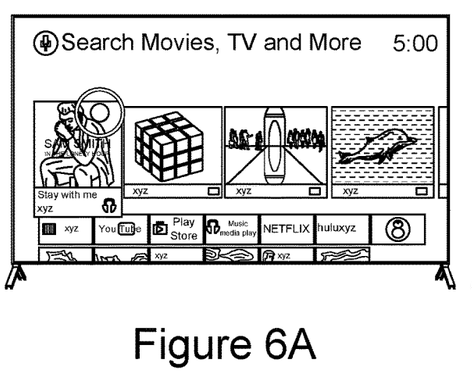
FIGS. 6A-6F illustrate screen shots with feedback to a user according to embodiments of the present principles.
Figure 6B:
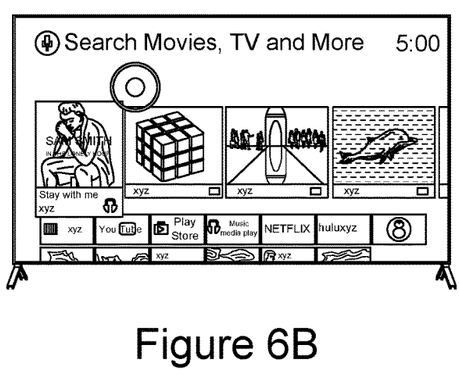

In an embodiment, the aiming feedback can further depend on what is aimed at. For example, different feedback can be provided if what is aimed at is an item that can be selected (e.g. a link, a button, a program, . . . ) or something that cannot be selected (such as a background). FIG. 6A illustrates an example of aiming feedback over a selectable item, in the example a program, while FIG. 6B illustrates an example of aiming feedback over a non-selectable item, in the example the background.

Upon determination that the hand is not in the aiming zone, in step S440, the processor determines, using the distance from the screen, if the hand is in the selection zone (302 in FIG. 3).

Upon determination that the hand is in the selection zone, in step S450, the processor performs a determined action, for example selecting an item on the screen corresponding to the "aim" of the user (as mentioned, analogous to a mouse click or a user tapping a touch screen) and provides action feedback on the screen. The action feedback is intended to inform the user that an action has been performed (is being performed, is about to be performed, or the like). FIG. 5D illustrates an example of action feedback. The method then goes back to step S410, in which the processor determines the position of the hand.

Figure 6C:
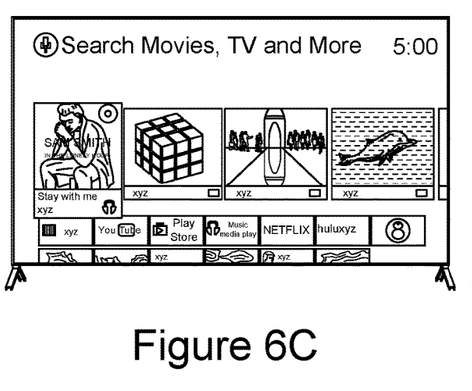
Figure 6D:
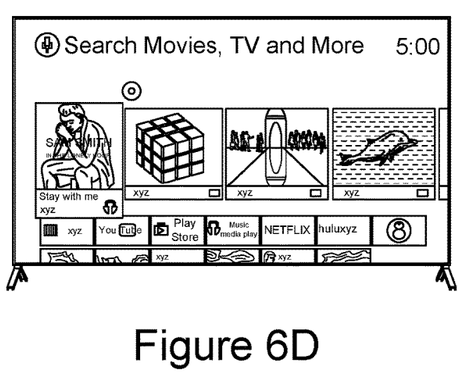

In an embodiment, the action feedback can depend on what is aimed at, much like the aiming feedback in step S430. For example, different feedback can be provided if what is aimed at is an item that can be selected (e.g. a link, a button, a program, . . . ) or something that cannot be selected (such as a background). FIG. 6C illustrates an example of action feedback over the program aimed at in FIG. 6A, while FIG. 6D illustrates an example of action feedback over the non-selectable item, i.e. the background, aimed at in FIG. 6B.

Upon determination that the hand is not in the selection zone, in step S460, the processor determines, using the distance from the screen, if the hand is in the protection zone (301 in FIG. 3).

Upon determination that the hand is in the selection zone, in step S470, the processor provides an alarm, for example by altering the image on the screen, for instance to display a message, provides a sound signal, or a combination of the two. The alarm is intended to warn the user that the hand is too close to the screen and thus risks touching the screen. FIG. 5E illustrates an example of an alarm. The method then goes back to step S410, in which the processor determines the position of the hand.

Figure 6E:
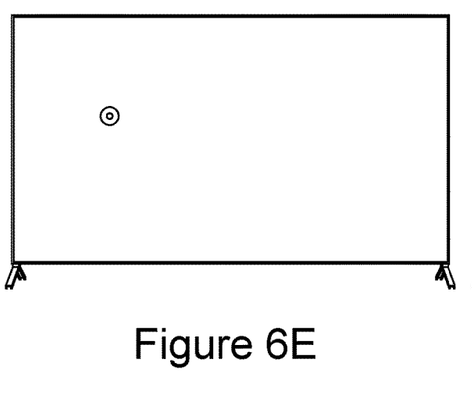
Figure 6F:
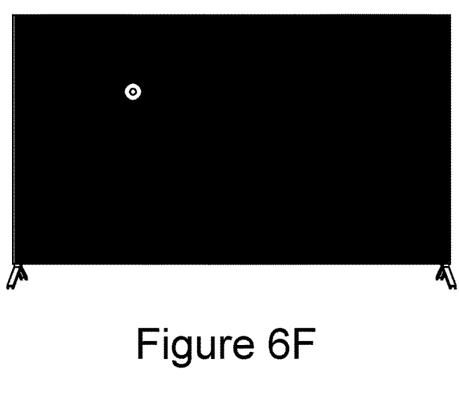

In an embodiment, the warning can depend on what is aimed at, much like the aiming feedback in step S430 and the action feedback in step S450. For example, different feedback can be provided if what is aimed at is an item that can be selected (e.g. a link, a button, a program, . . . ) or something that cannot be selected (such as a background). FIG. 6E illustrates an example of action feedback over the program aimed at in FIG. 6A and selected in FIG. 6C, while FIG. 6F illustrates an example of action feedback over the non-selectable item, i.e. the background, aimed at in FIG. 6B for which action feedback was provided in FIG. 6D.

Upon determination that the hand is not in the protection zone, the method then goes back to step S410, in which the processor determines the position of the hand.

Figure 5A:
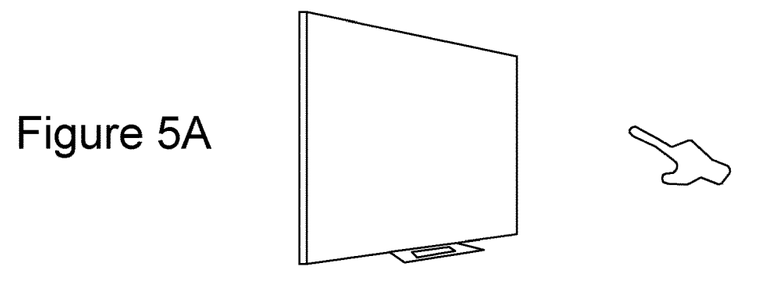
FIGS. 5A-5E illustrate display-hand interaction according to embodiments of the present principles.
Figure 5B:
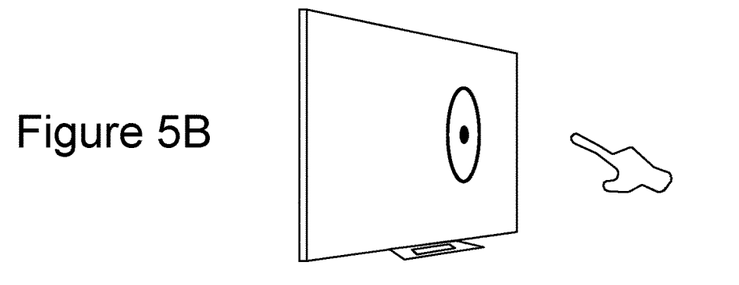
Figure 5C:
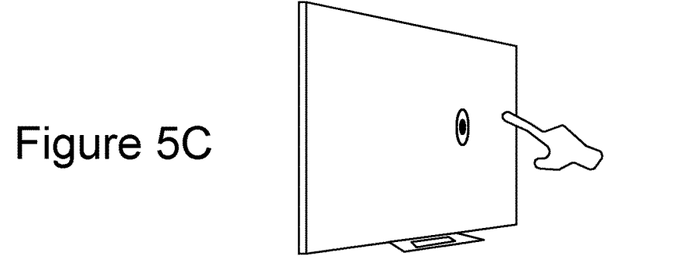
Figure 5D:
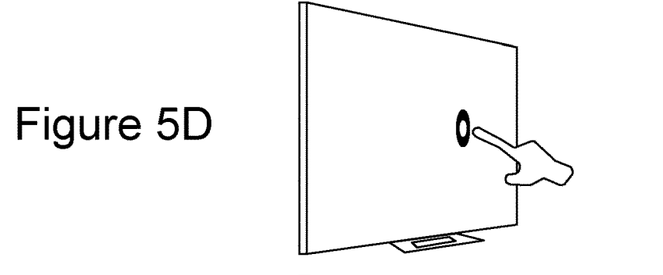
Figure 5E:
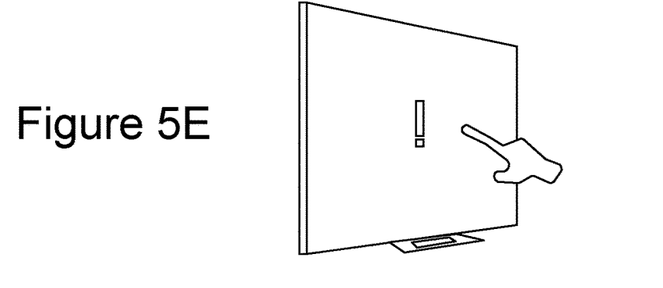

FIG. 5A illustrates a screen-hand example when the hand is in the distant zone, i.e. further away than the aiming zone.

It will be understood that the method can be implemented in analogous ways. For example, upon detection of the hand position, the processor can directly determine in which zone the hand is located and then move to the appropriate step, i.e. without first determining if the hand is in the aiming zone, then the selection zone, and so on.

It will also be understood that from a software point of view, the method can make use of an application GUI, an overlaid layer manager in the display or in an operating system. In case an overlaid layer manager is used, a navigation map can be used in order for the system to know which areas should be handled in which manner, such as which areas can be scrolled, which areas can be selected, etc. The navigation map can be a description file, a picture, a data stream or the like.

It is noted that the position can be translated into precise (X,Y) coordinates of the screen. However, as it is difficult for a user to keep the hand steady, aiming feedback can be provided for an area that can correspond roughly to the size of a fingertip. This was illustrated by the circle in for example FIGS. 5B and 5C.

Figure 7:
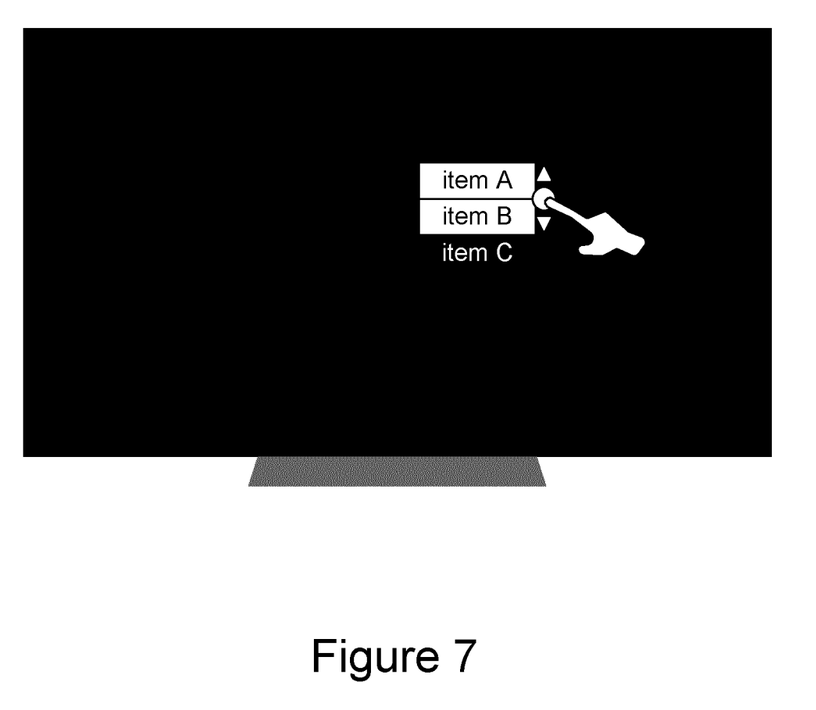
FIG. 7 illustrates a specific case of display-hand interaction according to embodiments of the present principles.

As such an area may extend over more than one selectable item, it may be necessary to distinguish between the items. Thus, in an embodiment, a particular action feedback, illustrated in FIG. 7, may be provided to allow the user to select the desired item. FIG. 7 shows how the area covers parts of both item A and item B. The user can then select either item by moving the finger up to select item A or down to select item B, as illustrated by the arrows.

In the description before, the position of the fingertip in front of the screen has been used to determine what the user points at. As already mentioned, in an alternate embodiment, the at least one sensor detects what the finger points at, i.e. determines the point at which an imagined extension of the finger intersects the screen.

In the alternate embodiment, the at least one sensor 130 detects the position of the user's finger (such as a plurality of points on the finger) and the processor 112 uses the data from the at least one processor 130 to estimate a vector corresponding to the direction the finger points in. The processor 112 can then calculate, based on the vector and a position along the vector (e.g. a starting position) determine the intersection of the vector and the screen. The intersection can for example be expressed in screen co-ordinates.

The processor 112 can use the intersection essentially as in the "fingertip" embodiment, i.e. providing aiming feedback in an aiming zone, perform an action, possibly with feedback, in a selection zone, and an alarm in a protection-zone.

A variant of the alternate embodiment can be used in particular with 3D content. In this case, the processor 112 can prolong the vector from the screen into the virtual world that is displayed and provide aiming feedback upon any objects with which the vector intersects or, failing that, on a, possibly imaginary, backdrop.

As will be seen, the 'fingertip' and the 'vector' embodiments can result in similar display coordinates.

For the "fingertip" implementation:
coords=f(sensor_coords, calibration)
where coords are the screen coordinates, sensor_coords are the measured coordinates and calibration provides calibration.

For the "3D vector" implementation
virtual_coords=f'(screen_coords', virtuality_calibration)
with
screen_coords'=f''(sensor_coords', calibration')
which gives, in one equation:
virtual_coords=f'(f''(sensor_coords', calibration'), virtuality_calibration)
where virtual_coords are the coordinates in the virtual world, screen_coords' are the screen coordinates and virtuality_calibration is the adjustment to the virtual world, sensor_coords' are the measured coordinates and calibration' provides (sensor) calibration. It is noted that coords can be replaced by vectors computed from coords.

In a more general expression, both the embodiments can be expressed as:
display_coords=function(measured_coords, match_calibration)

It will be appreciated that the present principles can be used in parallel with a conventional remote control, a gesture detection system, or both. For example, the system can be configured to use the present principles when the user's hand is within a certain distance from the display and the gesture detection when the user is further away. The distance can be configured during manufacture or by the user.

It will thus be appreciated that the present principles can be used to provide a user interface that protects the screen from touch and provides useful feedback to the user, for example through the direct feedback between the gesture and the displayed feedback that can make it easy for a user's brain to determine how to move the finger to obtain a desired result.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A system for user interaction, the system comprising:
a display including a screen for displaying images;
at least one hardware processor configured to:
receive input from at least one sensor detecting at least a position of a user's fingertip in front of the display, the fingertip belonging to a finger extended in a direction of the screen;
determine, from the input from the at least one sensor, an aim of the finger, wherein the aim corresponds to an intersection of the screen and a vector extending the finger;
display on the screen, on condition that the fingertip is in a first zone, an indicator at a position corresponding to the aim; and
select an object displayed in an image on the screen, the object located at the position on the screen corresponding to the aim, on condition that the fingertip is in a second zone, the second zone being closer to the screen than the first zone and distant from the screen, wherein, in case the indicator extends over a plurality of selectable objects in the image, the at least one processor is further configured to determine, based on input from the at least one sensor, a direction of movement of the finger parallel to the screen and to select the object corresponding to the direction of the movement.

2. The system of claim 1, wherein the at least one hardware processor is further configured to perform at least one action intended to keep the user from touching the screen when the fingertip is in a third zone, the third zone being closer to the screen than the second zone.

3. The system of claim 2, wherein the at least one action is giving an alarm by changing the image displayed on the screen or rendering sound on a speaker.

4. The system of claim 1, further comprising the at least one sensor and wherein the display, the at least one hardware processor and the at least one sensor are included in a single device.

5. The system of claim 1, wherein the at least one processor is included in a processing device configured to provide the images to the display.

6. The system of claim 1, wherein, in case the user extends more than one finger, the at least one hardware processor is configured to determine the aim based on a single finger.

7. The system of claim 1, wherein the indicator is rendered differently depending on at least one of the distance of the fingertip from the screen, the number of fingers extended by the user, and what can be done to an object underlying the indicator in the image.

8. The system of claim 1, wherein the system is configured to use, in a fourth zone further from the screen than the first zone, a gesture detection user interface, different from the aiming user interface used in the first and second zones.

9. A method of user interaction, the method comprising, in at least one hardware processor of a device:
receiving input from at least one sensor detecting at least a position of a user's fingertip in front of the display, the fingertip belonging to a finger extended in a direction of a screen;
determining, from the input from the at least one sensor, an aim of the finger, wherein the aim corresponds to an intersection of the screen and a vector extending the finger;
displaying on the screen, on condition that the fingertip is in a first zone, at a position corresponding to the aim, an indicator; and
selecting an object displayed in an image on the screen, the object located at the position on the screen corresponding to the aim, on condition that the fingertip is in a second zone, the second zone being closer to the screen than the first zone and distant from the screen, wherein, in case the indicator extends over a plurality of selectable objects in the image, based on input from the at least one sensor, a direction of movement of the finger parallel to the screen is determined and the object corresponding to the direction of the movement is selected.

10. The method of claim 9, further comprising performing at least one action intended to keep the user from touching the screen when the fingertip is in a third zone, the third zone being closer to the screen than the second zone.

11. A non-transitory computer-readable storage medium storing instructions that, when executed, cause at least one hardware processor to perform a method of claim 9.

* * * * *